United States Patent [19]

Huber et al.

[11] Patent Number: 4,460,726

[45] Date of Patent: Jul. 17, 1984

[54] METHOD FOR STABILIZING ORGANOPOLYSILOXANES

[75] Inventors: Peter Huber; Rudolf Kaufmann, both of Burghausen; Jüurgen Burkhardt, Winhöring, all of Fed. Rep. of Germany

[73] Assignee: Wacker-Chemie GmbH, Munich, Fed. Rep. of Germany

[21] Appl. No.: 533,020

[22] Filed: Sep. 16, 1983

[30] Foreign Application Priority Data

Feb. 23, 1983 [DE] Fed. Rep. of Germany ....... 3306295

[51] Int. Cl.$^3$ .............................................. C08K 5/15
[52] U.S. Cl. .................................. 524/114; 524/107; 524/109; 524/265; 528/21; 528/23; 556/401
[58] Field of Search ............... 524/107, 109, 114, 265; 528/21, 23; 556/401

[56] References Cited

U.S. PATENT DOCUMENTS

| | | | |
|---|---|---|---|
| 2,830,967 | 4/1958 | Nitzsche et al. | 528/23 |
| 2,990,419 | 6/1961 | Nitzsche et al. | 252/78.3 |
| 3,186,967 | 6/1965 | Nitzsche et al. | 528/23 |
| 3,398,176 | 8/1968 | Nitzsche et al. | 528/23 |
| 3,549,680 | 12/1970 | Wegehaupt et al. | 528/23 |
| 3,652,711 | 3/1972 | Triem et al. | 528/23 |
| 3,706,775 | 12/1972 | Nitzsche et al. | 556/417 |
| 3,839,388 | 10/1974 | Nitzsche et al. | 528/23 |
| 4,203,913 | 5/1980 | Burkhardt et al. | 556/401 |

Primary Examiner—Melvyn I. Marquis

[57] ABSTRACT

A method for stabilizing organopolysiloxanes containing phosphonitrile chlorides or their reaction products which promote the condensation and/or equilibration of organopolysiloxanes which comprises reacting at least one compound containing at least one epoxy group per molecule with the phosphorus compounds present in the organopolysiloxanes.

3 Claims, No Drawings

METHOD FOR STABILIZING ORGANOPOLYSILOXANES

The present invention relates to stabilized organopolysiloxanes and more particularly to a method for stabilizing organopolysiloxanes against changes in viscosity and discoloration

BACKGROUND OF THE INVENTION

Organosilicon compounds which contain Si-bonded oxygen have been condensed and/or equilibrated in the presence of phosphonitrile chlorides (often referred to as "phosphonitride chlorides") to form organopolysiloxanes. The organopolysiloxanes thus obtained from the condensation and/or equilibration contain phosphonitrile chlorides or their reaction products. A method has been described, for example, in U.S. Pat. No. 4,203,913 to Burkhardt et al, to stabilize these organopolysiloxanes against viscosity changes by adding basic nitrogenous compounds to the organopolysiloxanes which are prepared by the condensation and/or equilibration of organosilicon compounds in the presence of phosphonitrile chlorides. These basic nitrogenous compounds apparently react with the phosphorus compounds to stabilize the organopolysiloxanes against changes in viscosity.

It has been found that organopolysiloxanes which contain phosphonitrile chloride and/or reaction products thereof can be stabilized against viscosity changes and remain colorless at temperatures above 150° C. for extended periods of time. These organopolysiloxanes remain clear during storage; have particularly good electrical properties, such as low conductivity and high dielectric strength and are essentially noncorrosive to metals.

Therefore, it is an object of the present invention to provide stabilized organopolysiloxanes. Another object of the present invention is to provide organopolysiloxanes which are stabilized against changes in viscosity. Another object of the present invention is to provide a method for stabilizing organopolysiloxanes which contain phosphonitrile chlorides and/or reaction products thereof against changes in viscosity. Still another object of the present invention is to provide organopolysiloxanes which are colorless at temperatures above 150° C. and remain clear and colorless in storage. A further object of the present invention is to provide a method for preparing stable organopolysiloxanes having good electrical properties, such as low conductivity and high dielectric strength. A still further object of the present invention is to provide a method for preparing organopolysiloxanes which are essentially non-corrosive to metals.

SUMMARY OF THE INVENTION

The foregoing objects and others which will become apparent from the following description are accomplished in accordance with this invention, generally speaking, by providing a method for stabilizing organopolysiloxanes which are obtained from the condensation and/or equilibration of organosilicon compounds in the presence of phosphonitrile chlorides which comprises reacting the phosphonitrile chlorides and/or reaction products thereof which are present in the organopolysiloxanes with at least one compound containing at least one epoxy group per molecule.

DESCRIPTION OF THE INVENTION

Organopolysiloxanes which are stabilized in accordance with this invention against viscosity changes are preferably those having the general formula:

$$AO(SiR_2O)_mA$$

where R represents the same or different monovalent hydrocarbon radicals, substituted monovalent hydrocarbon radicals or hydrogen provided that each silicon atom to which hydrogen is bonded is also bonded to a hydrocarbon radical; A is hydrogen or a radical having the formula $-SiR'_3$, where R' is the same as R or is a monovalent hydrocarbon radical or a substituted monovalent hydrocarbon which is bonded via oxygen to a silicon atom and m is an integer having a value of at least 50.

Although these are not generally shown in the formulas up to 5 mol percent of the diorganosiloxane units can contain other siloxane units which are generally present only as impurities, such as monoorganosiloxane units or $SiO_{4/2}$ units or monoorganosiloxane units and $SiO_{4/2}$ units.

Examples of monovalent hydrocarbon radicals represented by R or of SiCn-bonded hydrocarbon radicals in the organopolysiloxanes to be stabilized in accordance with this invention are alkyl radicals such as methyl, ethyl, n-propyl, isopropyl, n-butyl and sec-butyl radicals; alkenyl radicals such as vinyl and allyl radicals and aryl radicals such as the phenyl radical.

Examples of substituted monovalent hydrocarbon radicals represented by R or of SiC-bonded substituted hydrocarbon radicals in the organopolysiloxanes to be stabilized in accordance with this invention are cyanoalkyl radicals such as the β-cyanoethyl radical; haloalkyl radicals such as the 3,3,3-trifluoropropyl radical and haloaryl radicals such as the o-, m-and p-chlorophenyl radicals.

Due to their availability, preferably at least 50 percent of the number of R radicals are methyl radicals. The other R radicals which are present are preferably vinyl or phenyl radicals or vinyl and phenyl radicals or hydrogen.

Examples of substituted or unsubstituted hydrocarbon radicals represented by R', which are bonded to silicon via oxygen are the methoxy, ethoxy and methoxyethyleneoxy ($CH_3OCH_2CH_2O-$) radicals.

The viscosity of the organopolysiloxanes which are stabilized in accordance with this invention is generally in the range of from $10^3$ to $5 \times 10^7$ mPa.s at 25° C.

The method of this invention is preferably employed for organopolysiloxanes in which A in the above formula represents hydrogen or a radical having the formula $-SiR_3$ such as the trimethylsilyl or dimethylvinylsilyl radicals or where a portion of A represents hydrogen and a portion of A represents a radical having the formula $-SiR_3$.

Mixtures of different organopolysiloxanes can also be stabilized in accordance with this invention.

The phosphonitrile chlorides which are present in the organopolysiloxanes to be stabilized against changes in viscosity in accordance with this invention, are those which, for example, are prepared by reacting 400 parts by weight of phosphorus pentachloride with 130 parts by weight of ammonium chloride (see, for example, "Berichte der Deutschen Chemischen Gesellschaft," Vol. 57, 1924, p. 1345) or those which are prepared by reacting 2 mols of phosphorus pentachloride with 1 mol of ammonium chloride (see, for example, U.S. Pat. No. 3,839,388 to Nitzsche et al). Phosphonitrile chlorides of the latter type are preferred.

It is not known with certainty whether the organopolysiloxanes obtained from the condensation and/or equilibration of organosilicon compounds containing Si-bonded oxygen in the presence of phosphonitrile chlorides actually contain phosphonitrile chlorides and/or reaction products thereof and/or reaction products of, for example, phosphonitrile chlorides and organopolysiloxanes. Therefore, it is impossible to describe the type of reaction products which may be present in the organopolysiloxanes. The presence before stabilization of such reaction products in organopolysiloxanes which have been obtained using phosphonitrile chlorides in the condensation and/or equilibration of organosilicon compounds containing Si-bonded oxygen, therefore, should not be excluded.

The preparation of organopolysiloxanes using phosphonitrile chlorides or reaction products thereof which promote the condensation or equilibration or condensation and equilibration of organopolysiloxanes is generally known in the art. For example, U.S. Pat. No. 2,830,967 to Nitzsche et al; U.S. Pat. No. 2,990,419 to Nitzsche et al; British Pat. No. 10 49 188 to Wacker-Chemie GmbH; U.S. Pat. No. 3,186,967 to Nitzsche et al; U.S. Pat. No. 3,398,176 to Nitzsche et al; U.S. Pat. No. 3,706,775 to Nitzsche et al; U.S. Pat. No. 3,652,711 to Triem et al; Swiss Pat. No. 809,229 to Wacker-Chemie GmbH; and U.S. Pat. No. 3,839,388 to Nitzsche et al, which are incorporated herein by reference, disclose the preparation of organopolysiloxanes which contain phosphonitrile chlorides.

Organopolysiloxanes which contain phosphonitrile chlorides and/or reaction products thereof which promote condensation and/or equilibration of organopolysiloxanes, are preferably those represented by the following general formula:

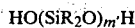

where R is the same as above and m' is an integer having a value of from 1 to 1000 or in admixture with organopolysiloxanes containing triorganosiloxy groups and having the general formula:

where R and m' are the same as above or mixtures of the organopolysiloxanes with other organosilicon compounds which contain triorganosiloxy groups.

In the preparation of organopolysiloxanes containing phosphonitrile chlorides or their reaction products which promote the condensation and/or equilibration of organopolysiloxanes, the phosphonitrile chlorides are generally used in an amount of from 0.001 to 0.1 weight percent and more preferably from about 0.003 to 0.05 weight percent based on the total weight of the organosilicon compounds whose condensation and/or equilibration is to be promoted.

In the compounds used in accordance with this invention which contain at least one epoxy group per molecule, the valences of the two carbon atoms of the epoxy group or groups which are not saturated by the valences of the epoxy oxygen or by the valences which join the two carbon atoms of the epoxy group directly with one another:

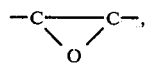

can be saturated, for example, by hydrogen atoms or alkyl, haloalkyl, aryl, alkaryl, ether, hydroxyalkyl or ester groups or by ring-forming divalent hydrocarbon radicals or by silyl or organosiloxane groups. It is preferred that the compounds used in the method of this invention, which contain at least one epoxy group per molecule, be a liquid at least at a temperature of from 5° to 30° C. at 1000 mbar (abs.) and be free of aliphatic multiple bonds and of groups which can form a salt with hydrogen chloride.

Examples of compounds which can be used in accordance with this invention and which contain at least one epoxy group per molecule are ethylene oxide, epichlorohydrin (1-chloro-2,3-epoxypropane), diglycidyl ethers such as bisphenol-A diglycidyl ether, glycidol, phenyl glycidyl ether (2,3-epoxypropyl phenyl ether), cyclohexene oxide, styrene oxide, a compound having the formula:

and triorganosiloxy end-blocked copolymers having units of the formula:

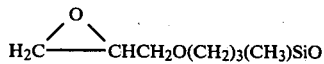

and dimethylsiloxane units.

Preferably, the compound containing at least one epoxy group per molecule is used in an amount of at least 2 gram-atoms oxygen and more preferably from 2 to 20 gram-atoms oxygen in the epoxy group or groups per gram-equivalent of $PNCl_2$ in the phosphonitrile chlorides used in the preparation of the organopolysiloxanes.

The compound containing at least one epoxy group per molecule can be dispersed in a diluent which is inert with respect to the compounds, such as a trimethylsiloxy end-blocked dimethylpolysiloxane or in a solvent which is inert with respect to such compounds such as benzene, toluene or perchloroethylene.

Preferably, the method of this invention is carried out at a temperature of from 0° to 200° C. and more preferably at a temperature of from 70 to 180° C. The method of this invention can be carried out at ambient pressure, that is, for example, at 1020 mbar (abs.), or under higher or lower pressures. Also, the method of this invention can be carried out batchwise, semi-continuously or as a continuous process. In order to ensure good mixing of the substances used in the method of this invention, the mixture containing the organopolysiloxanes and phosphonitrile chlorides or reaction products thereof which promote the condensation and/or equilibration of organopolysiloxanes and the compound containing at least one epoxy group per molecule is preferably agitated, for example, in a planetary paddle mixer, a twin-screw kneader or a gear pump.

The stabilized organopolysiloxanes of this invention may be used for the same purposes for which organopolysiloxanes stabilized according to the previously known methods could be used. They may be used, for example, as a thread lubricant or in the preparation of organopolysiloxane elastomers.

The phosphonitrile chloride used in the examples was prepared in accordance with the following procedure:

A mixture containing 417 g (2 mol) phosphorus pentachloride and 53.5 g (1 mol) of ammonium chloride in 1000 ml tetrachloroethane is refluxed for 12 hours on an oil bath at a temperature of 160° C. The volatile fractions are removed from the light-yellow colored solution thus obtained at 160° C. by lowering the pressure to approximately 1.33 mbar (abs.). Yellowish crystals which consist essentially of a compound having the formula $Cl_3PNPCl_2NPCl_3 \cdot PCl_6$ remain as the residue.

EXAMPLE 1

(a) A mixture containing 4000 g of dimethylpolysiloxane which has an Si-bonded hydroxyl group in each terminal unit and a viscosity of 130 mPa.s at 25° C., 270 g of a trimethylsiloxy end-blocked dimethylpolysiloxane which has a viscosity of 100 mPa.s at 25° C. and 1 ml of a 10 weight percent solution of phosphonitrile chloride in methylene chloride is heated at 80° C. and at 5 mbar (abs.) until a trimethylsiloxy end-blocked dimethylpolysiloxane having a viscosity of approximately 100,000 mPa.s at 25° C. is obtained.

(b) About 0.5 g of phenyl glycidyl ether is kneaded into the organopolysiloxane composition prepared in (a) above at 80° C. and at approximately 1020 mbar.

The resultant organopolysiloxane is clear and colorless. No change can be determined in the viscosity and appearance of this organopolysiloxane over a period of about 6 months. After 16 hours of heating to 200° C., the organopolysiloxane is still clear and colorless.

EXAMPLE 2

(a) A mixture containing 4000 g of dimethylpolysiloxane which has an Si-bonded hydroxyl group in each of its terminal units and a viscosity of 250 mPa.s at 25° C. and 0.5 ml of the 10 weight percent solution of phosphonitrile chloride in methylene chloride is heated at 80° C. and at 5 mbar (abs.) until a dimethylpolysiloxane having a viscosity of 500,000 mPa.s at 25° C. is obtained.

(b) About 0.2 g of epichlorohydrin are kneaded into the organopolysiloxane composition prepared in (a) above at 80° C. and approximately 1020 mbar.

The organopolysiloxane thus obtained is clear and colorless. No change is detected in the viscosity and appearance of this organopolysiloxane over a period of 6 months. After 16 hours of heating to 200° C., the organopolysiloxane is still clear and colorless.

EXAMPLE 3

About 100 liters per hour of a dimethylpolysiloxane having one Si-bonded hydroxyl group in each terminal unit and a viscosity of 120 mPa.s at 25° C., 7.2 liters per hour of a trimethylsiloxy end-blocked dimethylpolysiloxane having a viscosity of 63 mPa.s at 25° C. and 200 ml per hour of a 1 weight percent solution of the phosphonitrile chloride are continuously fed into a twin-screw kneader having a 4 meter reaction zone which is operated at 150° C. and at 5 mbar (abs.). The highly viscous trimethylsiloxy end-blocked dimethylpolysiloxane thus obtained, which is still at a temperature of 150° C., is mixed at the outlet tube with 200 ml per hour of a trimethylsiloxy end-blocked copolymer containing 10 mol percent of units having the formula:

and 90 mol percent of dimethylpolysiloxane units and a viscosity of 110 mPa.s at 25° C.

The organopolysiloxane thus obtained has a viscosity of 33,000 mPa.s at 25° C. and is clear and colorless. No change is detected in the viscosity and appearance of this organopolysiloxane over a period of 6 months. After 16 hours of heating at 200° C., the organopolysiloxane is still clear and colorless.

COMPARISON EXAMPLE $V_1$

The procecure described in Example 1 is repeated except that 0.5 g of 1,1,3,3-tetramethylbutylamine are substituted for the 0.5 g of phenyl glydicyl ether.

The organopolysiloxane thus obtained is clear and colorless. No change is detected in the viscosity of the organopolysiloxane over a period of about 6 months. However, within six weeks a solid precipitate can be detected in the organopolysiloxane.

COMPARISON EXAMPLE $V_2$

The procedure described in Example 2 is repeated except that 0.5 g of triisononylamine are substituted for the 0.2 g of epichlorohydrin.

COMPARISON EXAMPLE $V_3$

The procedure described in Example 3 is repeated except that 2 liters per hour of gaseous ammonia are mixed into the organopolysiloxane at the outlet tube using a gear pump instead of the epoxy-containing organopolysiloxane.

Pieces of cast iron (so-called "gray iron") are allowed to stand in open beakers at room temperature for 2 months in 100 ml of the organopolysiloxanes stabilized according to Examples 1, 2 and 3 as well as Comparison Examples $V_1$, $V_2$ and $V_3$. The pieces of cast iron in the stabilized organopolysiloxanes of Examples 1, 2 and 3 remain unchanged, whereas the pieces of cast iron in the organopolysiloxanes stabilized according to Comparison Examples $V_1$, $V_2$ and $V_3$ exhibit visual surface corrosion.

What is claimed is:

1. A method for stabilizing organopolysiloxanes, which contain phosphonitrile chlorides and/or reaction products thereof against changes in viscosity which comprises adding at least one compound containing at least one epoxy group per molecule to the organopolysiloxanes containing the phosphorus compounds.

2. The method of claim 1, wherein the compound containing at least one epoxy group per molecule is reacted with the phosphorus compounds at a temperature of from 0° to 200° C.

3. The method of claim 1, wherein the compound containing at least one epoxy group per molecule is present in an amount of at least 2 gram-atoms oxygen in the epoxy group per gram-equivalent $PNCl_2$ in the phosphonitrile chlorides used in the preparation of the organopolysiloxanes.

* * * * *

UNITED STATES PATENT AND TRADEMARK OFFICE
CERTIFICATE OF CORRECTION

PATENT NO. : 4,460,726
DATED : July 17, 1984
INVENTOR(S) : Dr. Peter Huber, Dr. Rudolf Kaufmann and Dr. Jürgen Burkhardt It is certified that error appears in the above-identified patent and that said Letters Patent are hereby corrected as shown below:

Page 1, column 1, under "inventors", line 2, after "Burghausen;" delete one "u" in the name "Jüurgen", which should read --- Jürgen ---.

Signed and Sealed this

Twenty-sixth Day of February 1985

[SEAL]

Attest:

DONALD J. QUIGG

Attesting Officer

Acting Commissioner of Patents and Trademarks